Dec. 13, 1960 G. M. J. SAROFEEN 2,964,501
GLYCOL CARBONATE ADDITION POLYMERS
Filed April 13, 1960
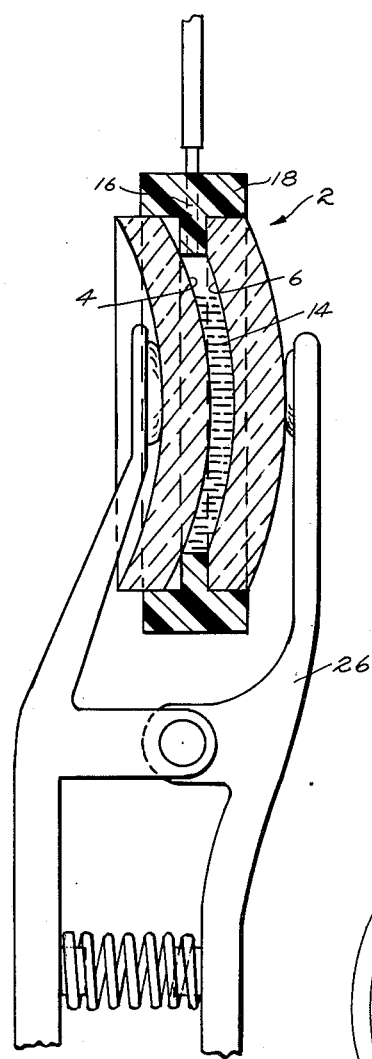
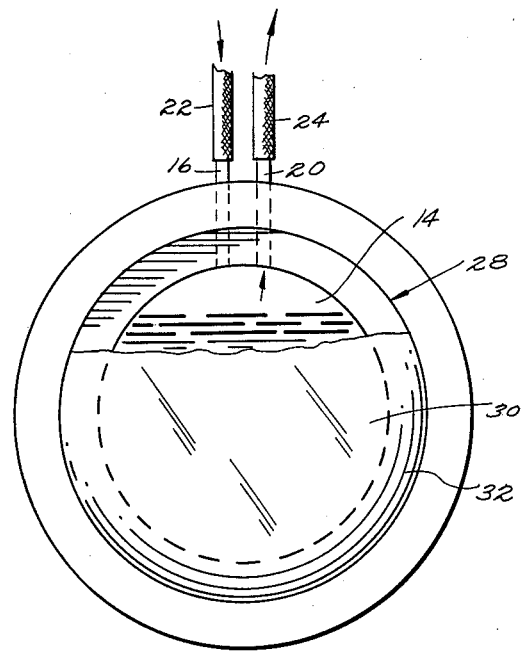
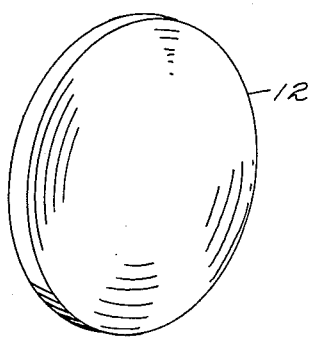
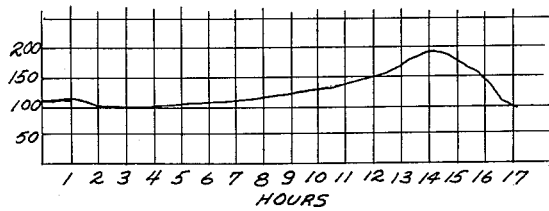
INVENTOR
GEORGE M. J. SAROFEEN
BY Cushman, Darby & Cushman
ATTORNEYS

United States Patent Office 2,964,501
Patented Dec. 13, 1960

2,964,501

GLYCOL CARBONATE ADDITION POLYMERS

George M. J. Sarofeen, Colonial Heights, Va., assignor to Titmus Optical Company, Inc., Petersburg, Va., a corporation of Virginia Filed Apr. 13, 1960, Ser. No. 22,025

18 Claims. (Cl. 260—77.5)

The present invention relates to the preparation and use of certain synthetic glass-like materials.

In the past there have been numerous attempts to prepare artificial glass-like materials having high scratch resistance, transparency, resiliency and shatter resistance. These attempts have not been completely successful. Some are extremely soft and easily married by scratching during normal cleaning procedures and others do not possess sufficient rigidity, clarity and/or freedom from color. Thus, polymerized diethylene glycol di-(allyl carbonate) which is the hardest of the synthetic resins now available from the standpoint of resistance to scratching retains residual amounts of objectionable color varying from a slight yellow edge hue to a marked yellow cast which is readily discernible when looking through a sheet of such material. Additionally, such materials have a tendency to become increasingly yellow on aging.

Some of the prior art resins are relatively color free but have the undesirable characteristic of being easily scratched. Still other resins are fusible and nonresistant to attack by solvents.

Accordingly, it is an object of the present invention to prepare a plastic material which overcomes these disadvantages of the prior art.

Another object is to prepare lenses from such a plastic material.

A further object is to prepare molded products from a thermosetting plastic which exhibit substantially no expansion or contraction on normal changes in atmospheric temperature.

An additional object is to eliminate the yellow cast ordinarily associated with polymerized diethylene glycol di(allyl carbonate) and similar resins.

Yet another object is to increase the surface reflectance of molded polymerized diethylene glycol di(allyl carbonate) and similar resins.

A still further object is to increase the toughness and reduce the brittleness and voids in molded diethylene glycol di(allyl carbonate) and similar resins.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by copolymerizing (1) an ester of a glycol with an acid ester of a monohydric alcohol containing at least one aliphatically unsaturated carbon to carbon double bond and carbonic acid in which both hydroxy groups of the glycol are esterified with the acid ester, (2) a diester of a monohydric alcohol containing at least one aliphatically unsaturated carbon to carbon double bond with a phthalic acid, and (3) a dialkyl ester of an alkenedioic acid.

To prepare a terpolymer which has outstanding utility in making lenses, there should be employed the following proportions of the three reactants:

|   | Percent |
| --- | --- |
| Glycol carbonate | 78–98 |
| Phthlate | 1–20 |
| Ester of an alkenedioic acid | 0.25–10 |

For very best results there are employed diethylene glycol di(allyl carbonate) 94%, diallyl ortho phthalate 4% and dibutyl maleate 2%.

The products of the present invention have high scratch resistance, excellent transparency, resiliency and shatter resistance. Furthermore, they exhibit no yellow cast, even on aging. Likewise, lenses made from the terpolymer exhibit no expansion or contraction on normal changes in atmospheric temperature, e.g., from $-10°$ C. to $+45°$ C. The terpolymers of the present invention have superior toughness, are less brittle and eliminate the voids normally associated with diethylene glycol di(allyl carbonate).

It has also been found that for maximum freedom from color the use of isopropyl percarbonate is the preferred catalyst. The catalyst is preferably employed in an amount of 2 to 6% of the polymerizable mixture.

In the accompanying drawings:

Figure 1 is a side elevation, partially in section illustrating the molding of a lens;

Figure 2 is a front elevation, partially broken away showing the manner of filling the mold to form a lenticular lens;

Figure 3 is a perspective view of a finished lens;

Figure 4 is a sectional view of the lens of Figure 3; and

Figure 5 is a graph showing a typical curing cycle.

Referring more specifically to the drawings, there is provided a two piece optically ground glass mold 2. The inner polished surface 4 of the mold has substantially the same curvature as the outer polished surface 6. As a result, the inner surface 8 and the outer surface 10 of the molded lens 12 are parallel. A mixture 14 of the three polymerizable materials and a catalyst is gradually poured into the mold through hole 16 in the gasket and spacer 18. Gasket 18 can be made of polyethylene but is preferably made of polyvinyl chloride (Geon) for the best dioptric properties. There is also provided a vent hole 20 in the gasket to permit air to escape from the mold. When the polymerizable mixture completely fills the mold, the holes 16 and 20 are closed with any suitable plugs 22 and 24, of wood, for example, prior to curing in the oven. The two halves of the mold are secured in place by means of spring clamp 26. The mold is filled with the polymerizable material in any convenient fashion, e.g., by means of a syringe and hypodermic needle.

Figure 2 illustrates the preparation of a lenticular lens 28 having a central curved surface 30 and an outer curved surface 32.

The mold apparatus of Figure 1 after being filled with the polymerizable material is placed in the oven and cured according to an appropriate cycle, e.g., that of Figure 5. The mold is then cooled gradually in the oven, e.g., with circulating air, to 100° F., removed from the oven, the clamp and gasket removed and the mold faces forcibly separated from the lens.

The lens at this point has its surfaces very sensitive to surrounding conditions, e.g., dust. To avoid any deleterious effect on the surface, the lens is immersed at room temperature in water containing an antistatic agent. The preferred antistatic agent is a long chain aliphatic amine acetate, e.g., Armac T (the acetate of a mixture of 30% hexadecylamine, 25% octadecylamine and 45% octadecenylamine; eighty-five percent of the amines are primary amines and the balance is secondary and tertiary amines of the same type). Ten grams of the antistatic agent are used per quart of water. It is believed that the use of the antistatic agent dissipates the electric charge and, hence, precludes orientation. As a result, the terpolymer takes up an amorphous, heterogeneous pattern.

At this stage the lens is a salable product. It needs no grinding, is clear, scratch resistant, extremely low in color, is lightweight and can be ground and polished to prescription. Surprisingly, the terpolymer is harder than the homopolymer of any of the three components thereof.

Unless otherwise indicated, all parts and percentages are by weight.

As the glycol for preparing the ester with an acid ester of carbonic acid there can be used ethylene glycol, propylene glycol, trimethylene glycol, diethylene glycol, triethylene glycol, tetraethylene glycol, 1,2-butylene glycol, 1,3-dibutylene glycol, pinacol, dipropylene glycol, tripropylene glycol, hexamethylene glycol and tetrapropylene glycol.

The acid ester of carbonic acid can be the ester with allyl alcohol, methallyl alcohol, 2-chloroallyl alcohol, propargyl alcohol, crotyl alcohol, oleyl alcohol, linoleyl alcohol or the hypothetical vinyl alcohol. Thus, in forming the terpolymer, as typical esters of a glycol with an acid ester of a monohydric alcohol containing at least one aliphatically unsaturated carbon to carbon double bond and carbonic acid there can be used ethylene glycol di(allyl carbonate), diethylene glycol di(allyl carbonate), propylene glycol di(allyl carbonate), tetraethylene glycol di(allyl carbonate), dipropylene glycol di(allyl carbonate), diethylene glycol di(methallyl carbonate), diethylene glycol allyl carbonate methallyl carbonate, ethylene glycol di(vinyl carbonate), triethylene glycol di(methallyl carbonate), diethylene glycol di(2-chlorallyl carbonate), diethylene glycol di(propargyl carbonate), diethylene glycol di(butadienyl carbonate), diethylene glycol di(cinnamyl carbonate) and diethylene glycol di(phenyl propargyl carbonate). The preferred carbonate is diethylene glycol di(allyl carbonate).

As the phthalate ester there can be employed the esters of ortho phthalic acid, isophthalic acid or terephthalic acid with any of the unsaturated alcohols previously recited. Typical phthalate esters which can be used to make the terpolymer are divinyl ortho phthalate, diallyl ortho phthalate, dimethallyl ortho phthalate, allyl methallyl ortho phthalate, dicrotyl ortho phthalate, dioleyl ortho phthalate, dipropargyl ortho phthalate, dibutadienyl ortho phthalate, di 2-chlorallyl ortho phthalate, dicinnamyl ortho phthalate, diallyl isophthalate, dicrotyl isophthalate, diallyl terephthalate, dimethallyl terephthalate, didecenyl terephthalate and dimethallyl isophthalate. The preferred phthalate ester is diallyl ortho phthalate.

The diallyl ortho phthalate can be employed as the monomer or mixture of the monomer with a substantially linear partial polymer of the diallyl ortho phthalate. Typical of such linear partial polymers of diallyl ortho phthalate is Dapon which is a dry, white solid that is soluble in the monomer. A mixture of 60 parts of Dapon and 40 parts of diallyl ortho phthalate monomer has a viscosity of 8000 centipoises. The partial polymers of the other phthalate esters can be similarly employed.

As the dialkyl ester of an alkenedioic acid there can be used the methyl to octadecyl esters of acids such as maleic acid, fumaric acid, itaconic acid and citraconic acid. The preferred esters are the lower alkyl esters, i.e., the alkyl group has not over eight carbon atoms. Typical examples of suitable esters are dimethyl maleate, diethyl maleate, dipropyl maleate, dibutyl maleate, propyl butyl maleate, di 2-ethylhexyl maleate, diamyl maleate, dihexyl maleate, dioctyl maleate, dioctadecyl maleate, dimethyl fumarate, diethyl fumarate, dibutyl fumarate, dioctyl fumarate, di secondary butyl maleate, diisooctyl maleate, dibutyl itaconate and dibutyl citraconate. The lower alkyl maleates and fumarates are preferred, dibutyl maleate being especially preferred.

As the catalyst there can be employed conventional free radical engendering substances such as isopropyl percarbonate, benzoyl peroxide, tertiary butyl perbenzoate, di tertiary butyl peroxide, pinacolone peroxide, acetyl peroxide, phthaloyl peroxide, lauroyl peroxide, cinnamoyl peroxide, acetyl benzoyl peroxide, methyl ethyl ketone peroxide, cumene hydroperoxide, diisopropyl benzene hydroperoxide, diethyl percarbonate, allyl percarbonate, methyl n-amyl ketone peroxide, p-chlorobenzoyl peroxide, acetone peroxide, potassium persulfate, sodium perborate, etc. The percarbonates, and particularly isopropyl percarbonate, are preferred.

The terpolymers of the present invention have numerous uses wherein their outstanding scratch resistance, water white clarity, improved surface reflectance and toughness can be employed to advantage. Thus, there can be prepared all kinds of lenses including, but not limited to, ophthalmic lenses, camera finder lenses, reading lenses, scale lenses, reflector lenses, binocular lenses, objective lenses, eyepiece lenses, contact lenses, condenser lenses, Schmidt lenses and lenticular lenses. The terpolymers can also be used to make optically clear flat sheets, simple curved sheets, compound curved sheets, airplane windshields, auto windshields, boat windshields, windows, bottles and other containers, and microscope slides.

It is critical that all three monomers be employed to form the product. The use of the maleate or fumarate is essential to avoid a yellow cast and to obtain improved surface reflectance. Omission of the phthalate reduces the toughness and increases the brittleness and also causes voids to be formed.

The length of time in the polymerization cycle is not a critical feature and varies to some extent on variations in thickness of the piece to be cast.

The curing can take place entirely in the mold. Hence, the lens comes out of the mold fully hardened. In prior art procedures, such as in Beattie Patent 2,542,386, for example, it is necessary to take the polymer out of the mold in an intermediate stage.

Another advantage of lenses made from the instant terpolymer rather than the polymerized diethylene glycol bis(allyl carbonate) of Beattie is that looking from the edge of the lenses the material is translucent rather than opaque. Additionally, the terpolymer is not as brittle. As previously set forth, there is virtually no expansion or contraction on changes in temperature.

*Example 1*

A mixture was made of 100 parts diethylene glycol di(allyl carbonate), 4 parts of a mixture of equal parts by weight of Dapon and diallyl ortho phthalate monomer (and also containing 0.3% of hydroquinone as a polymerization inhibitor) and 2 parts of dibutyl maleate. Then 4 parts of isopropyl percarbonate was added and the mixture was filtered, deaerated by means of a vacuum pump and the mixture placed in the mold as shown in Figure 1. The two halves of the mold had previously been coated with a mold release agent consisting of equal parts of distilled water and isopropanol. The mold halves were set to produce a lens having parallel surfaces to give a lens having a substantially uniform thickness of 4 mm. After filling the mold, the holes in the gasket were sealed with round toothpicks. The filled mold was then placed in the oven and cured for 16 hours using the temperature cycle set forth in Figure 5 of the specification. The initial temperature was about 100° F. and this was gradually increased to about 200° F. by the fifteenth hour, and was then allowed to drop slightly in the sixteenth hour The mold containing the terpolymer lens was then cooled gradually to about 100° F. and removed from the oven. The clamps and gasket rings were removed and the mold faces forcibly separated. Next the lens was immersed in water containing 10 grams of Armac T per quart of water so that it was no longer receptive to impressions such as fingerprints, hair, dust, etc. The resulting lens was a salable product which was colorless, clear, scratch resistant and could be ground and polished to prescription. The terpolymer lens was harder than a lens made from a polymer of any one of its consistuent monomers.

*Example 2*

Example 1 was repeated replacing the mixture of Dapon, diallyl phthalate monomer and inhibitor by 4 parts of diallyl phthalate monomer. Thus, the mixture poured into the mold consisted of:

| | Parts |
|---|---|
| Diethylene glycol di(allyl carbonate) | 100 |
| Diallyl ortho phthalate | 4 |
| Dibutyl maleate | 2 |
| Isopropyl percarbonate | 4 |

The product obtained was similar to that of Example 1.

*Example 3*

Example 1 was repeated replacing the dibutyl maleate by an equal weight of dibutyl fumarate with similar results.

*Example 4*

Example 1 was repeated but using a 23 hour curing cycle, namely, 16½ hours at 113° F., 2½ hours at 122° F., 2½ hours at 131° F. and 1½ hours at 144° F. The lens was similar to that of Example 1 but the curing cycle was slower and, hence, not as advantageous.

*Example 5*

Example 1 was repeated but there was molded a sheet ½ inch thick. The curing temperature over a 17 hour period was as follows:

| Time (hours): | Temp., ° C. |
|---|---|
| 0 | 44 |
| 1 | 45 |
| 2 | 46 |
| 3 | 47 |
| 4 | 48 |
| 5 | 49 |
| 6 | 50.5 |
| 7 | 52 |
| 8 | 53 |
| 9 | 55 |
| 10 | 57 |
| 11 | 60 |
| 12 | 62.5 |
| 13 | 66 |
| 14 | 70 |
| 15 | 75 |
| 16 | 83 |
| 17 | 105 |

The curing cycle of Example 5 is satisfactory to make sheets ¼ inch to ⅜ inch thick.

*Example 6*

Example 1 was repeated but there was molded a sheet ⅛ inch thick. The curing temperature over a 15 hour period was as follows:

| Time (hours): | Temp., ° C. |
|---|---|
| 0 | 46 |
| 1 | 47 |
| 2 | 48 |
| 3 | 49 |
| 4 | 50 |
| 5 | 52 |
| 6 | 53.5 |
| 7 | 55 |
| 8 | 57 |
| 9 | 60 |
| 10 | 63.5 |
| 11 | 66 |
| 12 | 69 |
| 13 | 74 |
| 14 | 82 |
| 15 | 105 |

The curing cycle of Example 6 is satisfactory to make sheets 1/16 to ⅛ inch thick.

*Example 7*

Example 1 was repeated but there was molded a sheet ½ inch thick over a 24 hour cycle. The curing temperature was raised as follows:

| Time (hours): | Temp., ° C. |
|---|---|
| 0 | 40 |
| 1 | 40.5 |
| 2 | 41 |
| 3 | 41.5 |
| 4 | 42 |
| 5 | 42.2 |
| 6 | 42.7 |
| 7 | 43.2 |
| 8 | 44 |
| 9 | 44.5 |
| 10 | 45 |
| 11 | 45.7 |
| 12 | 46.5 |
| 13 | 47.5 |
| 14 | 48.5 |
| 15 | 49.5 |
| 16 | 50.6 |
| 17 | 52 |
| 18 | 53 |
| 19 | 54.5 |
| 20 | 56.5 |
| 21 | 61.5 |
| 22 | 69 |
| 23 | 82 |
| 24 | 105 |

*Example 8*

Example 1 was repeated but there was molded a sheet less than 1/16 inch thick, e.g., 1/32 inch thick. The curing cycle over 11 hours and 36 minutes was as follows:

| Time (hours): | Temp., ° C. |
|---|---|
| 0 | 43.5 |
| 1 | 46 |
| 2 | 47 |
| 3 | 48 |
| 4 | 49 |
| 5 | 50.5 |
| 6 | 52 |
| 7 | 53.5 |
| 8 | 55.5 |
| 9 | 58.5 |
| 10 | 63 |
| 11 | 72 |
| 11.6 | 90 |

What is claimed is:
1. A terpolymer of (1) 78–98% of an ester of a glycol with an acid ester of a monohydric alcohol containing at least one aliphatically unsaturated carbon to carbon double bond and carbonic acid in which both hydroxy groups of the glycol are esterified with the acid ester, (2) 1–20% of a diester of a monohydric alcohol containing at least one aliphatically unsaturated carbon to carbon double bond with a phthalic acid, and (3) 0.25–10% of a dialkyl ester of an alkenedioic acid selected from the group consisting of maleic acid, fumaric acid, itaconic acid, and citraconic acid.

2. A lens made of the terpolymer of claim 1.

3. A terpolymer of (1) 78–98% of an ester of a glycol with an acid ester of an alkenyl monohydric alcohol and carbonic acid in which both hydroxy groups of the glycol are esterified with the acid ester, (2) 1–20% of an alkenyl monohydric alcohol ester of a phthalic acid, and (3) 0.25–10% of a dialkyl ester of an unsubstituted 1,2-alkenedioic acid having four carbon atoms.

4. A lens made of the terpolymer of claim 3.

5. A terpolymer of (1) 78–98% of diethylene glycol di(allyl carbonate), (2) 1–20% of a diallyl phthalate and (3) 0.25–10% of a dialkyl ester of an unsubstituted 1,2-alkenedioic acid having four carbon atoms.

6. A lens made of the terpolymer of claim 5.

7. A terpolymer of (1) 78–98% of diethylene glycol di(methallyl carbonate, (2) 1–20% of a diallyl phthalate, and (3) 0.25–10% of a dialkyl ester of an unsubstituted 1,2-alkenedioic acid having four carbon atoms.

8. A lens made of the terpolymer of claim 7.

9. A terpolymer of (1) 78–98% of diethylene glycol di(allyl carbonate), (2) 1–20% of diallyl ortho phthalate, and (3) 0.25–10% of a lower alkyl ester of an unsubstituted 1,2-alkenedioic acid having four carbon atoms.

10. A terpolymer according to claim 9 wherein said lower alkyl ester is a lower alkyl maleate.

11. A lens made of the terpolymer of claim 10.

12. A lens made of the terpolymer of claim 9.

13. A terpolymer of (1) 94% diethylene glycol di(allyl carbonate), (2) 4% diallyl ortho phthalate, and (3) 2% dibutyl maleate.

14. A process of making a terpolymer comprising polymerizing by heating a mixture of (1) 78–98% of an ester of a glycol with an acid ester of an alkenyl monohydric alcohol and carbonic acid in which both hydroxyl groups of the glycol are esterified with the acid ester, (2) 1–20% of an alkenyl monohydric alcohol ester of a phthalic acid, and (3) 0.25–10% of a dialkyl ester of an unsubstituted 1,2-alkenedioic acid having four carbon atoms in the presence of isopropyl percarbonate.

15. A process of making a terpolymer comprising polymerizing by heating a mixture of (1) 78–98% of diethylene glycol di(allyl carbonate), (2) 1–20% of diallyl ortho phthalate, and (3) 0.25–10% of dibutyl maleate in the presence of isopropyl percarbonate.

16. A lens made of the terpolymer of claim 1, said lens having been immersed in an aqueous mixture containing an antistatic agent.

17. A lens made of the terpolymer of claim 9, said lens having been immersed in an aqueous mixture containing an antistatic agent.

18. A lens according to claim 17 wherein said antistatic agent is a long chain aliphatic amine acetate.

References Cited in the file of this patent

FOREIGN PATENTS 782,507     Great Britain _____ Sept. 11, 1957

OTHER REFERENCES

Nugent: "American Jour. of Ophthalmology," vol. 33, No. 11, November 1950, pp. 1763–1768.

Starkweather et al.: "Industrial and Engineering Chemistry," vol. 47, No. 2, pp. 302–304, February 1955.